United States Patent [19]
Wolf, Jr. et al.

[11] 3,929,928
[45] Dec. 30, 1975

[54] BLEND OF THERMOPLASTIC POLYURETHANE ELASTOMER, CHLORINATED POLYETHYLENE, AND ADDITIONAL POLYETHYLENE

[75] Inventors: Harold G. Wolf, Jr., Waterbury; Robert A. Hlavacek, Naugatuck, both of Conn.

[73] Assignee: Uniroyal, Inc., New York, N.Y.

[22] Filed: Mar. 29, 1973

[21] Appl. No.: 345,923

[52] U.S. Cl. 260/859 R; 260/18 PF; 260/18 PT; 260/45.7 P; 260/859 PV
[51] Int. Cl.² C08L 75/00
[58] Field of Search 260/859 R, 859 PV

[56] References Cited
UNITED STATES PATENTS

| | | |
|---|---|---|
| 3,351,676 | 11/1967 | Saunders............................. 260/859 |
| 3,358,052 | 12/1967 | Archer................................. 260/859 |
| 3,429,948 | 2/1969 | Massoubre........................... 260/859 |
| 3,594,449 | 7/1971 | Binder................................. 260/859 |

FOREIGN PATENTS OR APPLICATIONS

| | | | |
|---|---|---|---|
| 1,119,041 | 7/1968 | United Kingdom................. | 260/859 |

*Primary Examiner*—Paul Lieberman
*Attorney, Agent, or Firm*—James J. Long

[57] ABSTRACT

Blends of thermoplastic polyurethane elastomer, chlorinated polyethylene and additional polyethylene resin have improved processing characteristics. The blends can be milled and calendered over a large temperature range.

2 Claims, No Drawings

BLEND OF THERMOPLASTIC POLYURETHANE ELASTOMER, CHLORINATED POLYETHYLENE, AND ADDITIONAL POLYETHYLENE

Copending application Ser. No. 345,922 of Khanna et al., filed of even date herewith, discloses blends of thermoplastic polyurethane elastomer and chlorinated polyethylene.

Copending application Ser. No. 345,924 of Balatoni et al., filed of even date herewith, discloses blends of thermoplastic polyurethane elastomer, chlorinated polyethylene and polyvinyl chloride resin.

This invention relates to a blend of thermoplastic polyurethane elastomer, chlorinated polyethylene, and additional polyethylene resin.

Numerous prior attempts have been made to overcome disadvantages of polyurethanes or other polymers by adding other materials, with only limited success, as far as providing the advantages realized by the present invention is concerned (see, for example, U.S. Pat. Nos. 2,592,763, 3,272,890, 3,310,604, 3,345,315, 3,358,052, 3,381,056, 3,384,679, 3,385,909, 3,429,948, 3,532,773, 3,594,449, 3,607,360 and 3,678,129; Canadian Pat. Nos. 654,404 and 750,974; Netherlands application No. 6,603,562 [Chem. Abstracts, Vol. 66, 1967, page 65116, item 66113h]).

Thermoplastic polyurethane elastomer exhibits excellent physical properties such as high tensile strength, good low temperature flexibility, and abrasion resistance. Unfortunately, it is extremely difficult to process on the conventional equipment ordinarily used for processing thermoplastics, particularly for making films or sheets (e.g., mills, calenders).

Chlorinated polyethylene exhibits good low temperature properties. However, its strength properties — hot or cold — are not as good as would be desirable.

The present invention is based on the discovery that a blend comprising thermoplastic polyurethane elastomer, chlorinated polyethylene, and additional polyethylene resin surprisingly provides unexpected advantages over the polymers alone or various other combinations of the polymers. The present novel blends are remarkable for the broad range of temperatures over which they can be processed (e.g., milled, calendered) successfully. The invention achieves improved results in a blend which is more economical than the thermoplastic polyurethane elastomer alone.

In one aspect the invention is directed to a ternary blend of polymers containing thermoplastic polyurethane elastomer, chlorinated polyethylene and additional polyethylene resin, the weight ratio of thermoplastic polyurethane elastomer to chlorinated polyethylene being from 80:20 to 20:80, preferably from 75:25 to 40:60, and the amount of additional polyethylene being from 1 to 10 parts, preferably from 4.5 to 7.5 parts, per 100 parts by weight of thermoplastic polyurethane elastomer plus chlorinated polyethylene.

The thermoplastic polyurethane elastomer used in the invention is a conventional material (see, for example "Polyurethane Technology", by Bruins, Interscience Publishers, pages 198–200; also "Modern Plastics Encyclopedia", 1968, page 289). Examples are such polyether based polyurethanes as that made from 2 moles of polytetramethylene ether glycol, 2 moles of MDI and 1 mole of 1,4-butane diol and polyester based polyurethanes such as are similarly derived from 1,4-butane diol-adipic acid polyester and MDI (Rubber Chemistry and Technology, Vol. 35, 1962, page 742, Schollenberger et al.). Commercially available materials of this category include Estane (trademark), Texin (trademark) 480-A, and Roylar (trademark) E-9. Many such products may be described as reaction products of a polymeric polyol (e.g., a polyester glycol or a polyether glycol) with an organic polyisocyanate (whether aromatic, aliphatic or cycloaliphatic), usually a diisocyanate, frequently along with a low molecular weight bifunctional material having two reactive hydrogens, such as a glycol or diamine (see also U.S. Pat. No. 3,462,326, Steele et al., Aug. 19, 1969, especially col. 3, lines 1 to 35; also U.S. Pat. No. 3,678,129, Fischer, July 18, 1972, col. 8, line 65 to col. 2, line 9 and col. 3, lines 19–30.) Thermoplastic polyurethane elastomer is a high molecular weight material devoid of olefinic unsaturation; it does not contain available —NCO groups.

The chlorinated polyethylene employed in the invention is likewise a known material, being a resin produced by chlorination of linear polyethylene. Various forms of chlorinated polyethylene resins employed may be described as elastomers having glass transition temperature of −30°C. to −20°C. at chlorine content of 25–50 wt. %. Their mechanical strength properties are a function of the molecular weight of polyethylene used, degree of residual crystallinity and the arrangement of chlorine atoms on the backbone. These materials are represented by the commercially available product known as "Tyrin" (trademark).

The additional polyethylene resins employed may be either of the low density (e.g., 0.910–0.925 g/cc), medium density (0.926–0.940 g/cc) or high density (e.g., 0.941–0.965 g/cc) type, whether prepared by high pressure processes or low pressure processes.

In addition to the principal components, the compositions of this invention may and normally would include other ingredients in minor amounts such as ozone, light and heat stabilizers, plasticizers, processing aids, fillers, coloring agents, and the like.

To prepare the blend, the polymers may first be premixed, for example in a dry blender. This preblend may then be fused and fluxed while working at elevated temperature (e.g., 320°–400°F., preferably 330°–360°F.), for example in an internal mixer such as a Banbury mixer, or on an open roll mill. If desired the polymers may be mixed in an extruder. A twin screw extruder or transfermix extruder may be used.

The three-component blend of the invention possesses the unique properties of elasticity, strength and processability. None of the components of the blend have all these qualities. The material processes over a wide temperature range above and below the expected processing temperature of the polyurethane alone, e.g., on the mill from 280° to 360°F. and also on the calender from 285° to 340°F., without sticking to the hot metal rolls. The material can be calendered into thin films (3 mils). The strength of the material at processing temperatures is sufficient for it to be machine handled (i.e., strip fed). This blend shows no gel particles. The rheological properties of this blend are such that a flat profile film can be obtained on calenders used for plasticized vinyl. The material possesses excellent hydrolysis resistance, is non-blocking, has good abrasion resistance, and has excellent aesthetic properties when coated in thin films (3–7 mils) on nap fabric.

The blend of the invention differs from certain prior art blends in that it has a wide processing temperature range. Certain prior blends contain additives (to polyurethane) in small amounts (less than 10%), whereas the present blend has greater than 20% non-polyurethane material. It is believed that blends of polyurethane elastomer and chlorinated polyethylene have a wider melt range than the base polyurethane elastomer. The third component surprisingly widens the processing temperature range further and acts as a release agent from the hot metal rolls of the mill or calender.

Other prior practices deal with thermosetting polyurethane blends which cannot be calendered, and are altogether different from the present calenderable thermoplastic blend.

The following examples, in which all quantities are expressed by weight unless otherwise indicated, will serve to illustrate the practice of the invention in more detail.

EXAMPLE 1

The thermoplastic polyurethane elastomer (hereinafter referred to as "TPU") employed in this example may be prepared by reacting a polyol blend comprising one equivalent of polytetramethylene ether glycol (1,000 molecular weight) and two equivalents of 1,4-butanadiol with methylene-bis (phenylisocyanate), the equivalency ratio of isocyanate to hydroxyl groups being 1.0–1.1.

The chlorinated polyethylene employed (hereinafter referred to as "CPE") has a chlorine content of 48% and a melt viscosity of 19 × 10³ poises ("Tyrin" [trademark]MX 2243.25).

The additional thermoplastic resin employed is a low density polyethylene (hereinafter referred to as "LDPE"), having a melt index of 23 and a density of 0.915 (DNDA 0917).

The three polymers are blended by charging them to a Banbury type mixer at a temperature of about 100°F. The ingredients are blended at a speed of 40 RPM for about 6 minutes after which time the temperature has reached about 350°F. The charge is then dropped on a hot (250°F) mill, sheeted and diced.

A number of mixes are made in this manner, using the proportions shown in Table I, and the processing behavior of the resulting blends is determined by observing the behavior on a mill, with the results shown in Table I.

TABLE I

| Blend No. | Thermoplastic Blends | | | |
|---|---|---|---|---|
| | 1 | 2 | 3 | 4 |
| Recipe: | | | | |
| TPU | 80 | 60 | 40 | 20 |
| CPE | 20 | 40 | 60 | 80 |
| LDPE | 5 | 5 | 5 | 5 |
| Mill Processing: | | | | |
| Temp. °F | 320 | 320 | 325–330 | 320 |
| Band | good | good | good | good |
| Release | good | good | excellent | good |

The results indicate that for a given LDPE level the processing characteristics of the blends are quite satisfactory within the TPU/CPE ratio range of 80/20–20/80.

If the example is repeated using higher or lower TPU:CPE ratios, either the processability is not acceptable or the physical properties are not satisfactory.

EXAMPLE 2

Example 1 is repeated, using varying amounts of LDPE as shown in Table II, wherein blend 5 is outside the invention since the LDPE content is less than 1 part per 100 parts of TPU plus CPE.

Blend 5 gives poor release in mill processing. Blends 6, 7, 8 and 9 represent the practice of the invention and gives good or excellent release.

Table II

| Blend No. | Varying Amounts of Polyethylene | | | | |
|---|---|---|---|---|---|
| | 5 | 6 | 7 | 8 | 9 |
| Recipe: | | | | | |
| TPU | 67 | 67 | 67 | 67 | 67 |
| CPE | 33 | 33 | 33 | 33 | 33 |
| LDPE | 0.5 | 1.0 | 3.0 | 5.0 | 10 |
| Mill Processing: | | | | | |
| Temp. °F | 320–330 | 330 | 325 | 325 | 325 |
| Release | poor | good | good | good | excel. |

EXAMPLE 3

A preferred formulation is as follows:

| Blend No. | 10 |
|---|---|
| TPU | 67 |
| CPE | 33 |
| LDPE | 5.9 |
| Stabilizers: | |
| e.g., barium cadmium laurate as represented by such commercial preparations as Mark WS [trademark] | 0.6 |
| tris (nonyl phenyl) phosphite | 0.2 |
| epoxidized soybean oil (e.g., Paraplex G-62 [trademark]) | 0.9 |
| | 100.0 |

This material has a wide processing range. It was found to process well on the mill without sticking at temperatures from 280° to 360°F. The material calendered at temperatures from 285° to 340°F. producing smooth films. Other polyurethane materials do not have this wide processing range.

The material has been calendered into thin films. A 5 mil film was produced on an inverted L calender with temperatures of outboard 295°; top 290°; middle 285°; bottom 300°F.

A 3 mil film was made on an inverted L calender using temperatures of outboard 325°; top 330°; center 330°; bottom 330°F. A 4 mil film was made on an inverted L production calender using temperatures of outboard 320°; top 330°; middle 340°F.; bottom as low as possible. In this last experiment the calendered film was gauged between the top and middle rolls. The material can be calendered into thin films over a wide temperature range.

A temperature of 310°F. on the bottom roll of the calender was too hot for a polyurethane/chlorinated polyethylene (67/33) blend without any polyethylene. This material started to stick to the bottom roll at 310°F.

Films on the tri-blend 3 to 7 mils thick laminated to napped cotton fabric (weight about 9 ounces per square yard) produced a coated fabric having good aesthetic qualities and a very soft hand. Fabric laminated directly to the tri-blend material on the calender also made coated fabric with excellent aesthetic qualities.

Typical physical properties of a 3 mil film are as follows:

| | |
|---|---|
| 100% Modulus | 1330 psi |
| 300% Modulus | 3330 psi |
| Tensile strength | 4500 psi |
| Elongation | 360% |

In contrast, binary blends of TPU and CPE containing no polyethylene did not process as well, tending to produce grainy films with sticking or blocking. Milling blends of TPU and polyethylene containing no CPE resulted in severe plate-out of the polyethylene on the mill rolls (exuding of polymer; blend separation leading to deposition on rolls).

EXAMPLE 4

Thermoplastic blends are prepared according to the method of Example 1 from the polyether polyurethane and the chlorinated polyethylene of Example 1 and high density polyethylene, the latter having a density of 0.95 and a melt index of 0.6 at 190°C (the designation being HDPE), known as Hifax (trademark) 4400-E. The blend ratios and concentrations as well as their processing and physical properties are summarized in Table III, wherein the physical properties are determined according to ASTM D-412 at 12 inches per minute extension rate.

Table III

| Blend No. | Blends With High Density Polyethylene | | |
|---|---|---|---|
| | 11 | 12 | 13 |
| Recipe: | | | |
| TPU | 67 | 67 | 67 |
| CPE | 33 | 33 | 33 |
| HDPE | 5 | 10 | 15 |
| Mill Processing: | | | |
| Temp. °F | 330 | 330 | 330 |
| Band | smooth | smooth | smooth |
| Release | excellent | good | good |
| Plate-out | none | trace | severe |
| Physical Properties: | | | |
| 300% Modulus, psi | 2260 | 2040 | 1920 |
| Tensile strength, psi | 4390 | 3210 | 2890 |
| Elongation, % | 460 | 440 | 450 |

The results in Table III demonstrate that up to 10 parts of HDPE per hundred parts of combined TPU and CPE the processing characteristics of the blends are from excellent to satisfactory at good physical properties, whereas above the 10 part level processing and physical properties are unsatisfactory.

We claim:

1. A method of making a shaped article comprising preparing a millable, calenderable thermoplastic composition comprising a blend of
   a. a high molecular weight thermoplastic polyurethane elastomer devoid of ethylenic unsaturation and free —NCO groups which is a reaction product of a polymeric polyol, an organic polyisocyanate and a low molecular weight bifunctional material having two reactive hydrogens,
   b. an elastomeric chlorinated polyethylene having a glass transition temperature of —30°C. to —20°C. and a chlorine content of 25–50% by weight, and
   c. additional polyethylene resin, the weight ratio of (a) to (b) in the said blend being within the range from 75:25 to 40:60, and the amount of (c) being from 4.5 to 7.5 parts, per 100 parts by weight of (a) plus (b), and forming the resulting blend into a shaped article without cure.

2. A method as in claim 1 in which (a) is a reaction product of polytetramethylene ether glycol, butanediol-1,4 and diphenylmethane-p,p'-diisocyanate.

* * * * *